United States Patent
Lee et al.

(10) Patent No.: US 10,855,401 B2
(45) Date of Patent: Dec. 1, 2020

(54) METHOD FOR DETERMINING RETRANSMISSION NUMBERS OF SIDELINK DATA IN WIRELESS COMMUNICATION SYSTEM AND A DEVICE THEREFOR

(71) Applicant: LG ELECTRONICS INC., Seoul (KR)

(72) Inventors: Jaewook Lee, Seoul (KR); Youngdae Lee, Seoul (KR); Jongwoo Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 26 days.

(21) Appl. No.: 16/330,070

(22) PCT Filed: Nov. 2, 2017

(86) PCT No.: PCT/KR2017/012346
§ 371 (c)(1),
(2) Date: Mar. 1, 2019

(87) PCT Pub. No.: WO2018/084608
PCT Pub. Date: May 11, 2018

(65) Prior Publication Data
US 2019/0229853 A1    Jul. 25, 2019

Related U.S. Application Data

(60) Provisional application No. 62/417,288, filed on Nov. 3, 2016.

(51) Int. Cl.
*G08C 25/02* (2006.01)
*H04L 1/18* (2006.01)
(Continued)

(52) U.S. Cl.
CPC .............. *H04L 1/08* (2013.01); *H04L 1/0003* (2013.01); *H04L 1/0026* (2013.01); *H04L 1/12* (2013.01);
(Continued)

(58) Field of Classification Search
CPC ......... H04W 28/0236; H04W 28/0252; H04W 40/125; H04W 92/18; H04W 72/048;
(Continued)

(56) References Cited

U.S. PATENT DOCUMENTS

2015/0327180 A1* 11/2015 Ryu ......................... H04L 1/00
370/329
2016/0128082 A1    5/2016 Chen et al.
(Continued)

FOREIGN PATENT DOCUMENTS

| WO | 2016095119 | 6/2016 |
| WO | 2016163825 | 10/2016 |

OTHER PUBLICATIONS

PCT International Application No. PCT/KR2017/012346, Notification of Transmittal of the International Search Report and the Written Opinion of the International Searching Authority, or Declaration dated Feb. 27, 2018, 11 pages.
(Continued)

*Primary Examiner* — Guerrier Merant
(74) *Attorney, Agent, or Firm* — Lee, Hong, Degerman, Kang & Waimey

(57) ABSTRACT

The present invention relates to a wireless communication system. More specifically, the present invention relates to a method and a device for determining number of retransmissions of sidelink data in wireless communication system, the method comprising: determining number of retransmissions of sidelink data when the sidelink data is available for transmission; transmitting the sidelink data via direct inter-
(Continued)

Uplink and Downlink with eNB

Sidelink ( Direct Communication between Device and Device )

face between UEs; and retransmitting the sidelink data as many as the determined number of retransmissions.

12 Claims, 12 Drawing Sheets

(51) Int. Cl.
*H04L 1/08* (2006.01)
*H04W 40/12* (2009.01)
*H04W 28/02* (2009.01)
*H04L 1/12* (2006.01)
*H04L 1/00* (2006.01)
*H04L 1/20* (2006.01)
*H04W 24/08* (2009.01)
*H04W 92/18* (2009.01)

(52) U.S. Cl.
CPC .......... *H04L 1/1812* (2013.01); *H04L 1/1825* (2013.01); *H04L 1/20* (2013.01); *H04W 24/08* (2013.01); *H04W 28/0236* (2013.01); *H04W 28/0252* (2013.01); *H04W 40/125* (2013.01); *H04W 92/18* (2013.01)

(58) Field of Classification Search
CPC ........... H04W 72/005; H04W 72/0446; H04W 72/02; H04W 72/0453; H04W 72/0406; H04W 52/18; H04W 52/383; H04W 76/14; H04L 1/1825; H04L 1/0026; H04L 1/08; H04L 1/12; H04L 1/20; H04L 1/1812; H04L 1/0003; H04L 5/0053; H04L 5/0044; H04L 5/14; H04L 1/0009; H04L 1/00
See application file for complete search history.

(56) References Cited

U.S. PATENT DOCUMENTS

| | | | |
|---|---|---|---|
| 2016/0173239 A1* | 6/2016 | Kim | H04L 1/1812 370/329 |
| 2017/0164396 A1* | 6/2017 | Matsumoto | H04W 72/02 |
| 2017/0201360 A1* | 7/2017 | Shin | H04W 72/0406 |
| 2017/0230959 A1* | 8/2017 | Wu | H04W 72/048 |
| 2019/0068261 A1* | 2/2019 | Priyanto | H04B 7/0452 |
| 2020/0153536 A1* | 5/2020 | Ryu | H04W 52/18 |

OTHER PUBLICATIONS

Intel, "On PSCCH and PSSCH retransmission and combining options", 3GPP TSG RAN WG1 Meeting #86, R1-167695, Aug. 2016, 5 pages.
NTT Docomo, "Details of prioritizing sidelink transmissions over UL transmissions", 3GPP TSG RAN WG1 Meeting #86, R1-167360, Aug. 2016, 3 pages.

* cited by examiner (a) Control-Plane Protocol Stack (b) User-Plane Protocol Stack

METHOD FOR DETERMINING RETRANSMISSION NUMBERS OF SIDELINK DATA IN WIRELESS COMMUNICATION SYSTEM AND A DEVICE THEREFOR

CROSS-REFERENCE TO RELATED APPLICATIONS

This application is the National Stage filing under 35 U.S.C. 371 of International Application No. PCT/KR2017/012346, filed on Nov. 2, 2017, which claims the benefit of U.S. Provisional Application No. 62/417,288, filed on Nov. 3, 2016, the contents of which are all hereby incorporated by reference herein in their entireties.

TECHNICAL FIELD

The present invention relates to a wireless communication system and, more particularly, to a method for determining a number of retransmissions of sidelink data in wireless communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

An object of the present invention devised to solve the problem lies in a method and device for determining a number of retransmissions of sidelink data in wireless communication system.

The technical problems solved by the present invention are not limited to the above technical problems and those skilled in the art may understand other technical problems from the following description.

Technical Solution

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

Advantageous Effects

In this invention, it is proposed of retransmission scheme in sidelink depending on the sidelink status or feedback information received from a peer UE.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
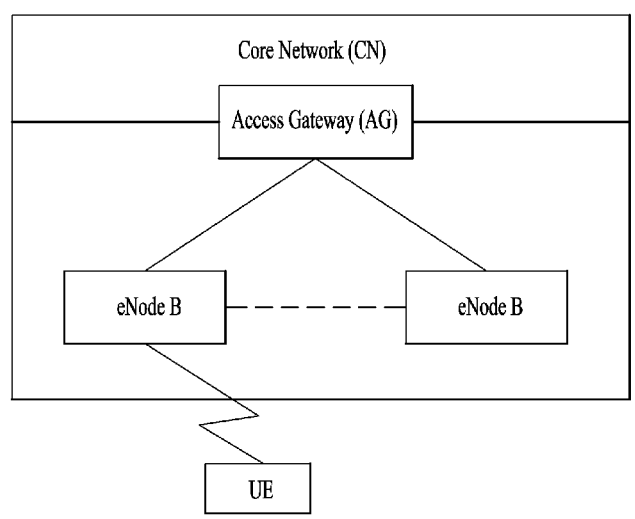
FIG. 1 is a diagram showing a network structure of an Evolved Universal Mobile Telecommunications System (E-UMTS) as an example of a wireless communication system.
Figure 2A:
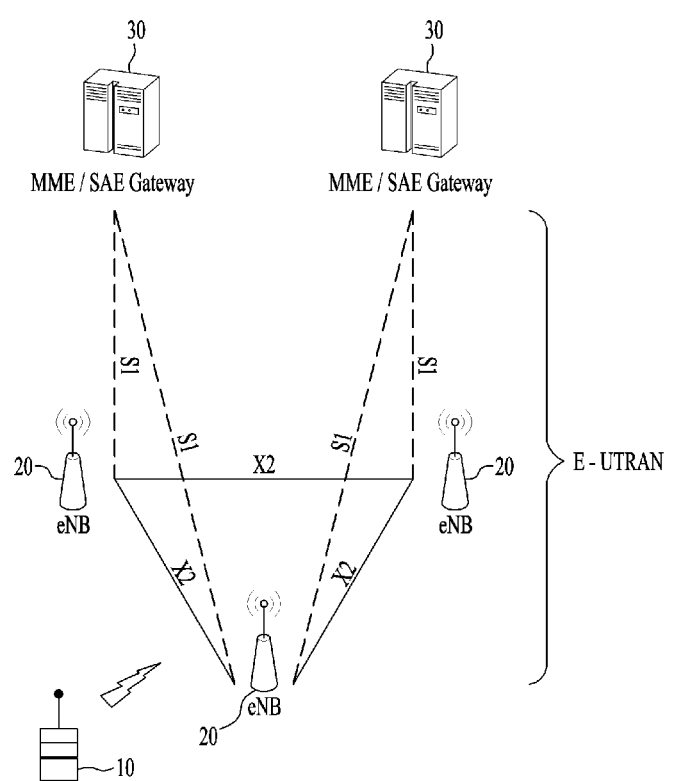
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
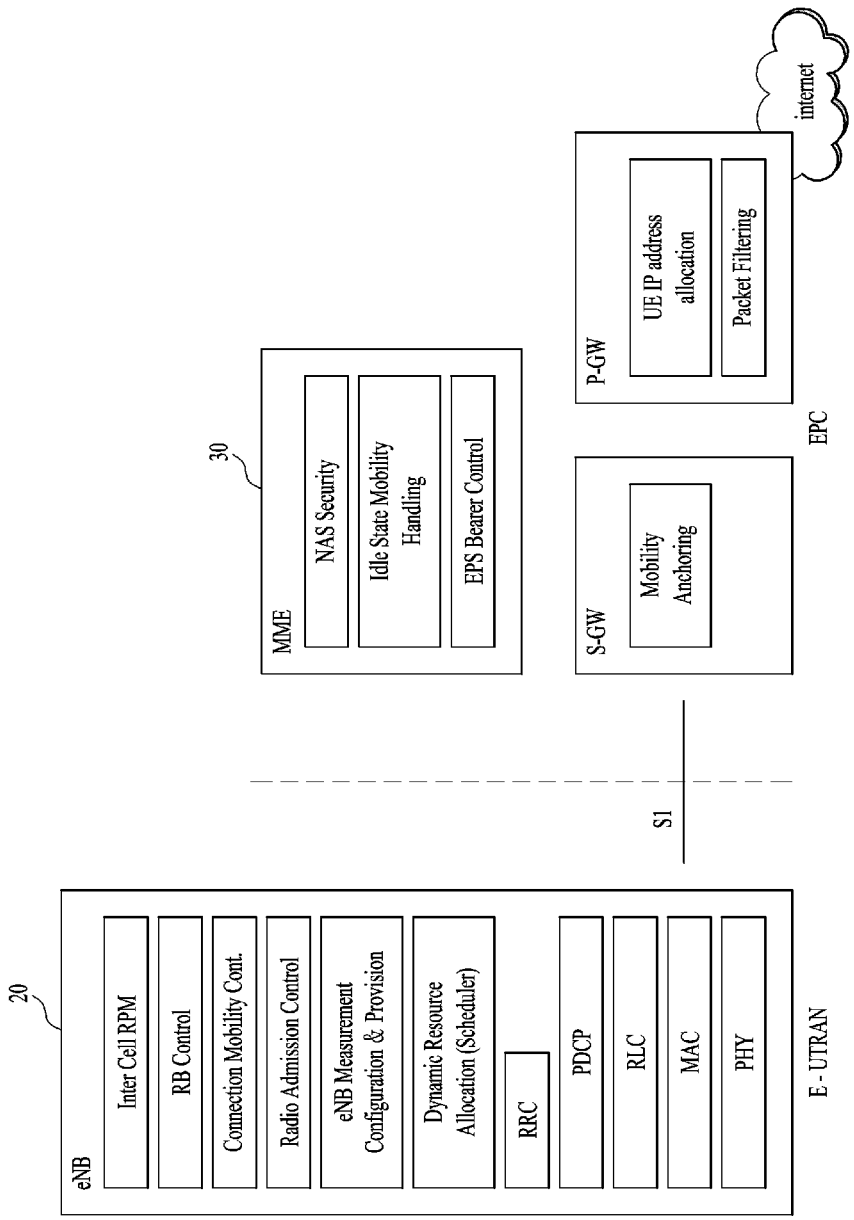
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
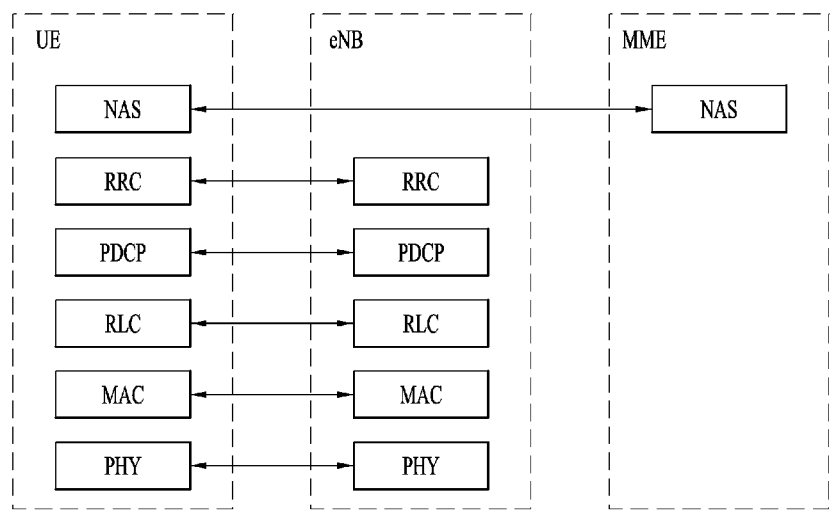
FIG. 3 is a diagram showing a control plane and a user plane of a radio interface protocol between a UE and an E-UTRAN based on a 3rd generation partnership project (3GPP) radio access network standard.
Figure 3:
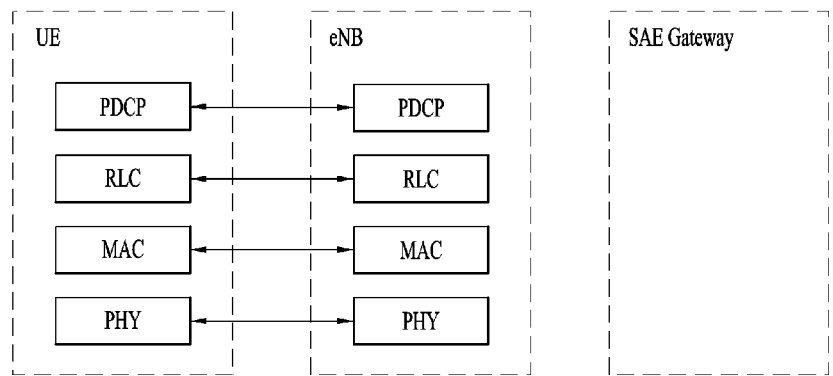

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel Data is transported between the MAC layer and the PHY layer via the transport channel Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
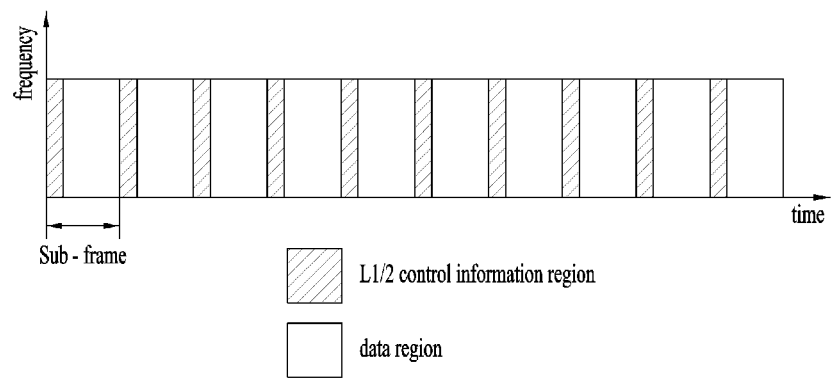
FIG. 4 is a view showing an example of a physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PD-CCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
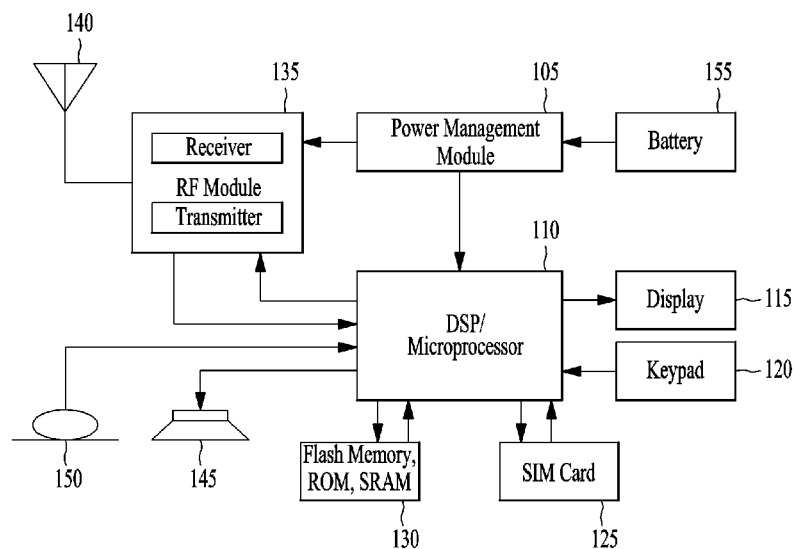
FIG. 5 is a block diagram of a communication apparatus according to an embodiment of the present invention.

FIG. 5 is a block diagram of a communication apparatus according to an embodiment of the present invention.

The apparatus shown in FIG. 5 can be a user equipment (UE) and/or eNB adapted to perform the above mechanism, but it can be any apparatus for performing the same operation.

As shown in FIG. 5, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 5 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 5 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

Figure 6:
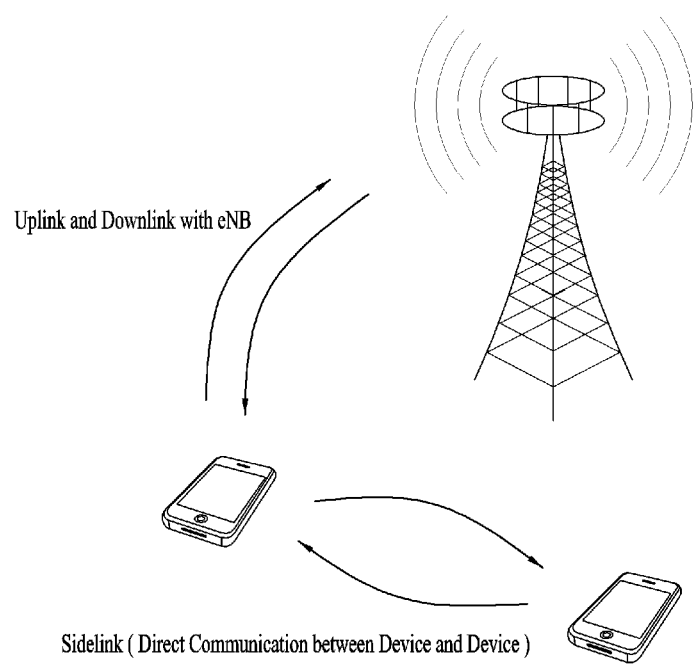
FIG. 6 is a conceptual diagram for sidelink communication.

FIG. 6 is a conceptual diagram for sidelink communication.

Sidelink comprises sidelink discovery, sidelink communication and V2X sidelink communication between UEs. Sidelink uses uplink resources and physical channel structure similar to uplink transmissions. However, some changes, noted below, are made to the physical channels. Sidelink transmission uses the same basic transmission scheme as the UL transmission scheme. However, sidelink is limited to single cluster transmissions for all the sidelink physical channels. Further, sidelink uses a 1 symbol gap at the end of each sidelink subframe. For V2X sidelink communication, PSCCH and PSSCH are transmitted in the same subframe. The sidelink physical layer processing of transport channels differs from UL transmission in the following steps: for PSDCH and PSCCH, the scrambling is not UE-specific; and modulation of 64 QAM and 256 QAM is not supported for sidelink. PSCCH is mapped to the sidelink control resources. PSCCH indicates resource and other transmission parameters used by a UE for PSSCH. For PSDCH, PSCCH and PSSCH demodulation, reference signals similar to uplink demodulation reference signals are transmitted in the 4-th symbol of the slot in normal CP and in the 3rd symbol of the slot in extended cyclic prefix. The sidelink demodulation reference signals sequence length equals the size (number of sub-carriers) of the assigned resource. For V2X sidelink communication, reference signals are transmitted in 3rd and 6th symbols of the first slot and 2nd and 5th symbols of the second slot in normal CP. For PSDCH and PSCCH, reference signals are created based on a fixed base sequence, cyclic shift and orthogonal cover code. For V2X sidelink communication, cyclic shift for PSCCH is randomly selected in each transmission.

Sidelink communication is a mode of communication whereby UEs can communicate with each other directly over the PC5 interface. This communication mode is supported when the UE is served by E-UTRAN and when the UE is outside of E-UTRA coverage. Only those UEs authorised to be used for public safety operation can perform sidelink communication.

In order to perform synchronization for out of coverage operation UE(s) may act as a synchronization source by transmitting SBCCH and a synchronization signal. SBCCH carries the most essential system information needed to receive other sidelink channels and signals. SBCCH along with a synchronization signal is transmitted with a fixed periodicity of 40 ms. When the UE is in network coverage, the contents of SBCCH are derived from the parameters signaled by the eNB. When the UE is out of coverage, if the UE selects another UE as a synchronization reference, then the content of SBCCH is derived from the received SBCCH; otherwise UE uses pre-configured parameters. SIB18 provides the resource information for synchronization signal and SBCCH transmission. There are two pre-configured subframes every 40 ms for out of coverage operation. UE receives synchronisation signal and SBCCH in one subframe and transmit synchronisation signal and SBCCH on another subframe if UE becomes synchronization source based on defined criterion.

UE performs sidelink communication on subframes defined over the duration of Sidelink Control period. The Sidelink Control period is the period over which resources allocated in a cell for sidelink control information and sidelink data transmissions occur. Within the Sidelink Control period the UE sends sidelink control information followed by sidelink data. Sidelink control information indicates a Layer 1 ID and characteristics of the transmissions (e.g. MCS, location of the resource(s) over the duration of Sidelink Control period, timing alignment).

The UE performs transmission and reception over Uu and PC5 with the following decreasing priority order in case Sidelink Discovery Gap is not configured:
  i) Uu transmission/reception (highest priority);
  ii) PC5 sidelink communication transmission/reception;
  iii) PC5 sidelink discovery announcement/monitoring (lowest priority).

The UE performs transmission and reception over Uu and PC5 with the following decreasing priority order in case Sidelink Discovery Gap is configured:
  i) Uu transmission/reception for RACH;
  ii) PC5 sidelink discovery announcement during a Sidelink Discovery Gap for transmission;
  iii) Non-RACH Uu transmission;
  iv) PC5 sidelink discovery monitoring during a Sidelink Discovery Gap for reception;
  v) Non-RACH Uu reception;
  vi) PC5 sidelink communication transmission/reception.

Figure 7A:
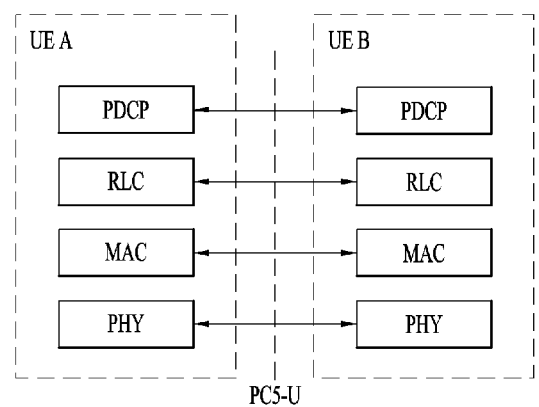
FIG. 7a is a diagram for protocol stack for the user plane of sidelink communication.
Figure 7B:
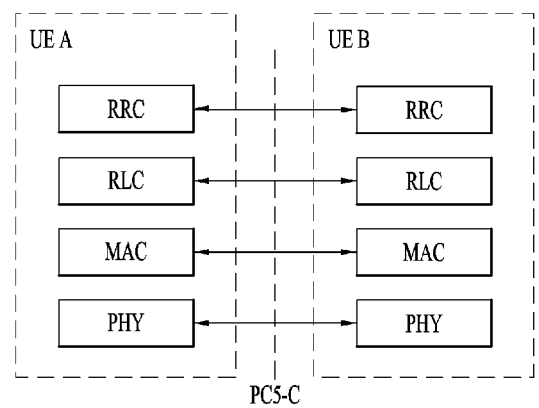
FIGS. 7b and 7c are diagrams for protocol stack for the control plane of sidelink communication.
Figure 7C:
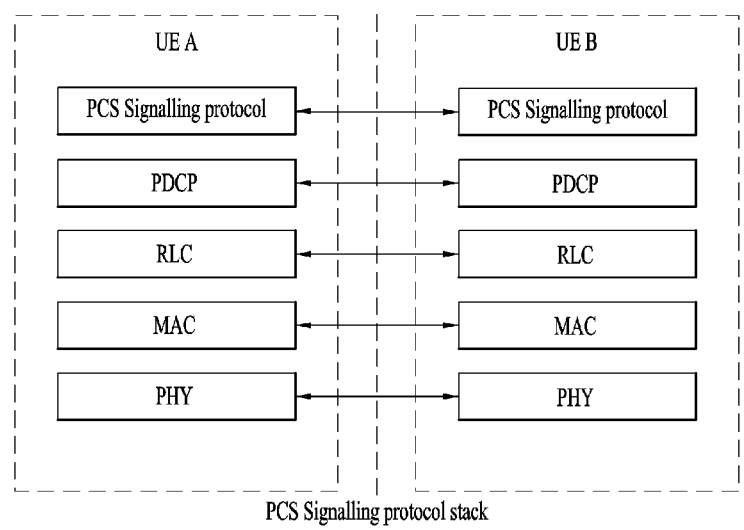

FIG. 7a is a diagram for protocol stack for the user plane of sidelink communication, FIGS. 7b and 7c are diagrams for protocol stack for the control plane of sidelink communication;

FIG. 7a shows the protocol stack for the user plane, where PDCP, RLC and MAC sublayers (terminate at the other UE) perform the functions listed for the user plane. The Access Stratum protocol stack in the PC5 interface consists of PDCP, RLC, MAC and PHY as shown below in FIG. 7a.

User plane details of sidelink communication: i) there is no HARQ feedback for sidelink communication; ii) RLC UM is used for sidelink communication; iii) a receiving UE needs to maintain at least one RLC UM entity per transmitting peer UE; iv) a receiving RLC UM entity used for sidelink communication does not need to be configured prior to reception of the first RLC UMD PDU; v) a ROHC Unidirectional Mode is used for header compression in PDCP for sidelink communication.

A UE may establish multiple logical channels. LCID included within the MAC subheader uniquely identifies a logical channel within the scope of one Source Layer-2 ID and Destination Layer-2 ID combination. Parameters for logical channel prioritization are not configured. The Access stratum (AS) is provided with the PPPP of a protocol data unit transmitted over PC5 interface by higher layer. There is a PPPP associated with each logical channel.

A UE does not establish and maintain a logical connection to receiving UEs prior to one-to-many a sidelink communication. Higher layer establishes and maintains a logical connection for one-to-one sidelink communication including ProSe UE-to-Network Relay operation.

The Access Stratum protocol stack for SBCCH (Sidelink Broadcast Control Channel) in the PC5 interface consists of RRC, RLC, MAC and PHY as shown below in FIG. 7b.

The control plane for establishing, maintaining and releasing the logical connection for one-to-one sidelink communication is shown in FIG. 7c.

Figure 8:
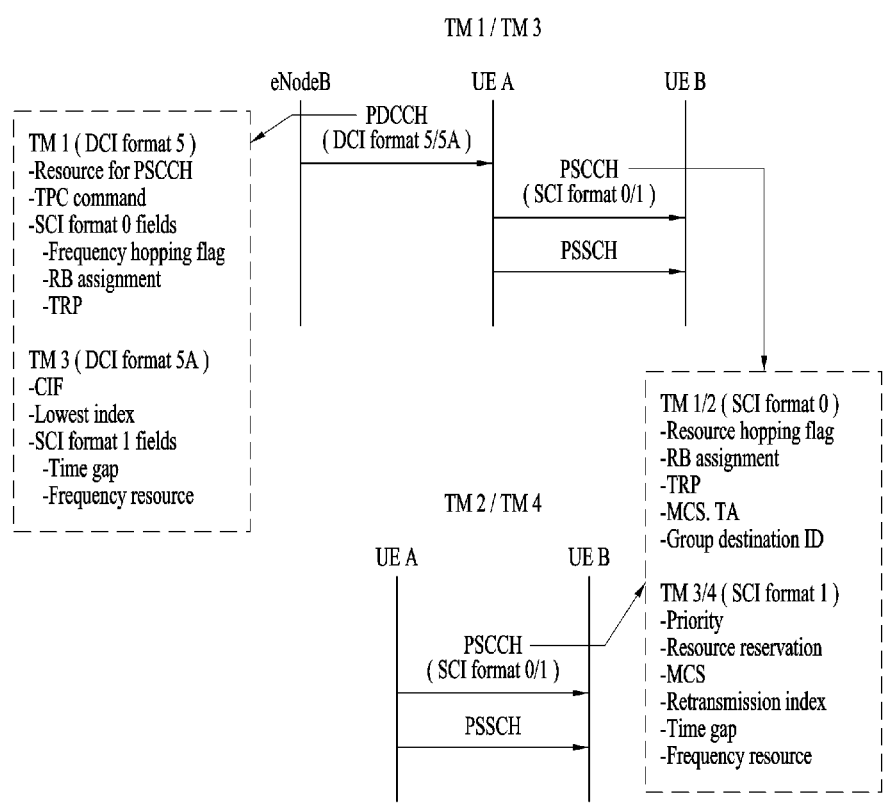
FIG. 8 is a diagram for various transmission modes for Sidelink.

FIG. 8 is a diagram for various transmission modes for Sidelink. As shown in FIG. 8, the 3GPP sidelink communication supports a total of four transmission modes (TM). Here, TM1 is a base station scheduling mode in D2D/eD2D, and TM2 is a terminal autonomous scheduling mode in D2D/eD2D. Meanwhile, TM 3 is a base station scheduling mode in V2X, and TM 4 is a terminal autonomous scheduling mode in V2X.

Scheduled resource allocation (TM1, 3) is characterized by: i) the UE needs to be RRC_CONNECTED in order to transmit data; ii) the UE requests transmission resources from the eNB. The eNB schedules transmission resources for transmission of sidelink control information and data.

In this case, the UE sends a scheduling request (D-SR or Random Access) to the eNB followed by a Sidelink BSR. Based on the Sidelink BSR the eNB can determine that the UE has data for a sidelink communication transmission and estimate the resources needed for transmission. eNB can schedule transmission resources for sidelink communication using configured SL-RNTI.

The UE autonomous resource selection (TM2, 4) is characterized by:

i) A UE on its own selects resources from resource pools and performs transport format selection to transmit sidelink control information and data;

ii) There can be up to 8 transmission pools either pre-configured for out of coverage operation or provided by RRC signalling for in-coverage operation. Each pool can have one or more PPPP associated with it. For transmission of a MAC PDU, the UE selects a transmission pool in which one of the associated PPPP is equal to the PPPP of a logical channel with highest PPPP among the logical channel identified in the MAC PDU. It is up to UE implementation how the UE selects amongst multiple pools with same associated PPPP. There is a one to one association between sidelink control pool and sidelink data pool;

iii) Once the resource pool is selected, the selection is valid for the entire Sidelink Control period. After the Sidelink Control period is finished the UE may perform resource pool selection again.

Figure 9:
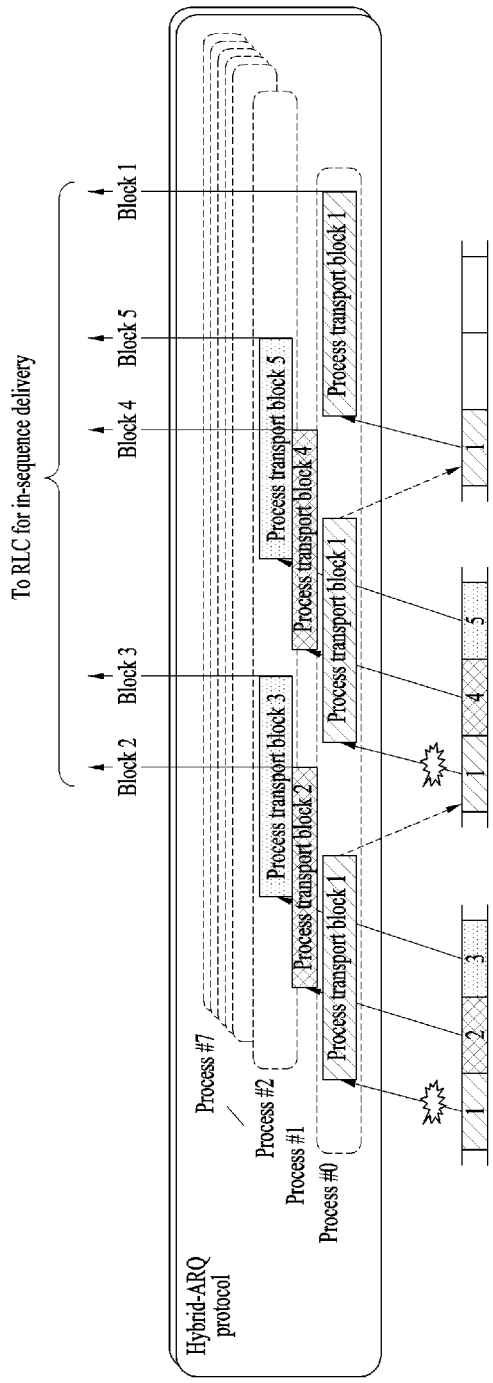
FIG. 9 is a diagram for multiple parallel hybrid-ARQ processes forming one hybrid-ARQ entity.

FIG. 9 is a diagram for multiple parallel hybrid-ARQ processes forming one hybrid-ARQ entity.

The hybrid-ARQ functionality spans both the physical layer and the MAC layer; generation of different redundancy versions at the transmitter as well as the soft combining at the receiver are handled by the physical layer, while the hybrid-ARQ protocol is part of the MAC layer.

The basis for the LTE hybrid-ARQ mechanism is a structure with multiple stop-and-wait protocols, each operating on a single transport block. In a stop-and-wait protocol, the transmitter stops and waits for an acknowledgement after each transmitted transport block. This is a simple scheme; the only feedback required is a single bit indicating positive or negative acknowledgement of the transport block. However, since the transmitter stops after each transmission, the throughput is also low.

LTE therefore applies multiple stop-and-wait processes operating in parallel such that, while waiting for acknowledgement from one process, the transmitter can transmit data to another hybrid-ARQ process. This is illustrated in FIG. 9; while processing the data received in the first hybrid-ARQ process the receiver can continue to receive using the second process and so on. This structure, multiple hybrid-ARQ processes operating in parallel to form one hybrid-ARQ entity, combines the simplicity of a stop-and-wait protocol while still allowing continuous transmission of data.

Upon receiving a transport block for a certain hybrid-ARQ process, the receiver makes an attempt to decode the transport block and informs the transmitter about the outcome through a hybrid-ARQ acknowledgement, indicating whether the transport block was correctly decoded or not. The time from reception of data until transmission of the hybrid-ARQ acknowledgement is fixed, hence the transmitter knows from the timing relation which hybrid-ARQ process a received acknowledgement relates to. This is beneficial from an overhead perspective as there is no need to signal the process number along with the acknowledgement.

An important part of the hybrid-ARQ mechanism is the use of soft combining, which implies that the receiver combines the received signal from multiple transmission attempts. Clearly, the receiver needs to know when to perform soft combining prior to decoding and when to clear the soft buffer—that is, the receiver needs to differentiate between the reception of an initial transmission (prior to which the soft buffer should be cleared) and the reception of a retransmission. Similarly, the transmitter must know whether to retransmit erroneously received data or to transmit new data. Therefore, an explicit new-data indicator is included for each of the one or two scheduled transport blocks along with other downlink scheduling information on the PDCCH. The new-data indicator is present in both downlink assignments and uplink grants, although the meaning is slightly different for the two.

For downlink data transmission, the new-data indicator is toggled for a new transport block—that is, it is essentially a single-bit sequence number. Upon reception of a downlink scheduling assignment, the terminal checks the new-data indicator to determine whether the current transmission should be soft combined with the received data currently in the soft buffer for the hybrid-ARQ process in question, or if the soft buffer should be cleared.

For uplink data transmission, there is also a new-data indicator transmitted on the downlink PDCCH. In this case, toggling the new-data indicator requests transmission of a new transport block, otherwise the previous transport block for this hybrid-ARQ process should be retransmitted (in which case the eNodeB should perform soft combining).

The use of multiple parallel hybrid-ARQ processes operating in parallel can result in data being delivered from the hybrid-ARQ mechanism out of sequence. For example, transport block 5 in FIG. 9 was successfully decoded before transport block 1, which required two retransmissions. Out-of sequence delivery can also occur in the case of carrier aggregation, where transmission of a transport block on one component carrier could be successful while a retransmission is required on another component carrier. To handle out-of-sequence delivery from the hybrid-ARQ protocol, the RLC protocol includes an in-sequence-delivery mechanism.

Figure 10:
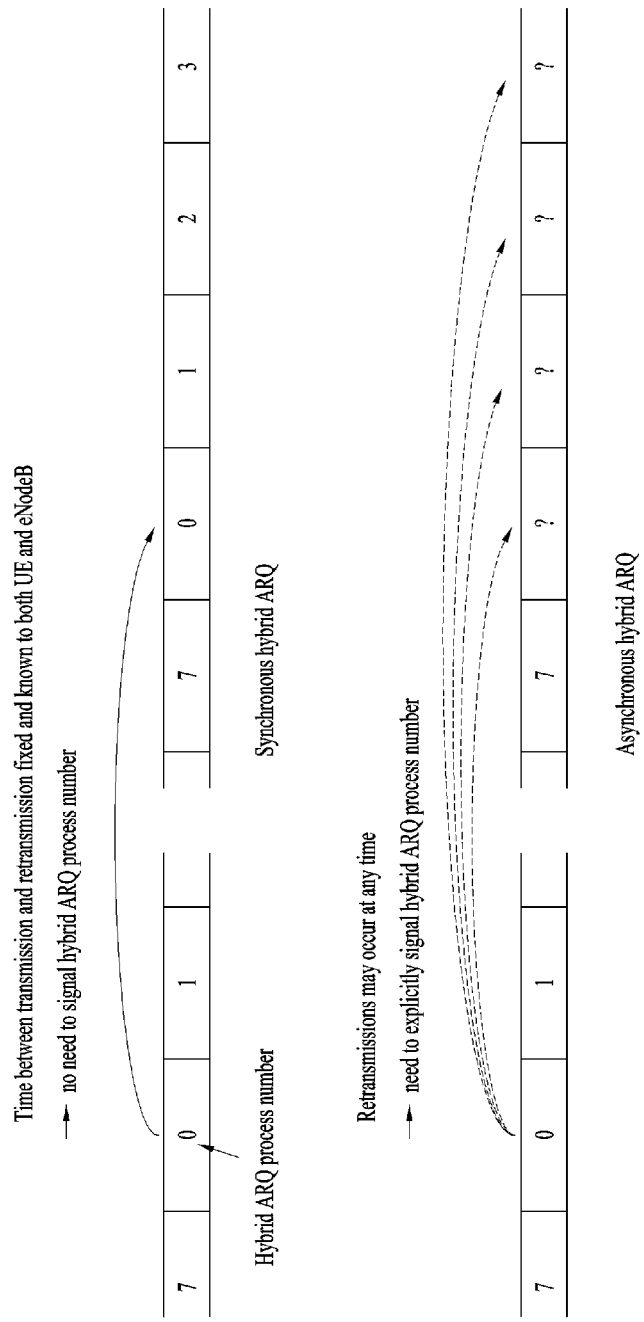
FIG. 10 is a diagram for synchronous and asynchronous hybrid ARQ.

FIG. 10 is a diagram for synchronous and asynchronous hybrid ARQ.

Hybrid-ARQ protocols can be characterized as synchronous vs. asynchronous, related to the flexibility in the time domain, as well as adaptive vs. non-adaptive, related to the flexibility in the frequency domain:

An asynchronous hybrid-ARQ protocol implies that retransmissions can occur at any time, whereas a synchronous protocol implies that retransmissions occur at a fixed time after the previous transmission (see FIG. 10). The benefit of a synchronous protocol is that there is no need to explicitly signal the hybrid-ARQ process number as this information can be derived from the subframe number. On the other hand, an asynchronous protocol allows for more flexibility in the scheduling of retransmissions.

An adaptive hybrid-ARQ protocol implies that the frequency location and possibly also the more detailed transmission format can be changed between retransmissions. A non-adaptive protocol, in contrast, implies that the retransmission must occur at the same frequency resources and with the same transmission format as the initial transmission.

In the case of LTE, asynchronous adaptive hybrid ARQ is used for the downlink. For the uplink, synchronous hybrid ARQ is used. Typically, the retransmissions are non-adaptive, but there is also the possibility to use adaptive retransmissions as a complement.

In sidelink, there are no HARQ feedback, and retransmissions are always performed in a pre-defined/configured number. Measurement gaps and sidelink discovery transmission during a sidelink discovery gap for transmission are of higher priority than HARQ retransmissions: whenever an HARQ retransmission collides with a measurement gap or sidelink discovery transmission during a sidelink discovery gap for transmission, the HARQ retransmission does not take place.

Meanwhile, currently, since in sidelink, RLC UM is only supported and blind HARQ retransmission without any feedback in HARQ process, it is not reliable and it would cause unnecessary transmission.

For example, when the UE transmits sidelink data to the peer UE, if status for the channel for transmitting the sidelink link is good, the UE doesn't need to retransmit the sidelink data as many as the pre-defined or pre-configured numbers, but the UE should retransmits. This causes waste of resources. Conversely, if the channel condition is poor, more retransmissions may be required than the pre-defined or pre-configured numbers. Therefore, a new mechanism for determining the number of retransmissions according to channel conditions is needed.

Further, when the UE transmits sidelink data to the peer UE, the number of retransmissions of the sidelink data may be different, depending on the state of the peer UE receiving the sidelink data. Therefore, a new mechanism for determining the number of retransmissions using feedback information received from the peer UE is required.

Figure 11:
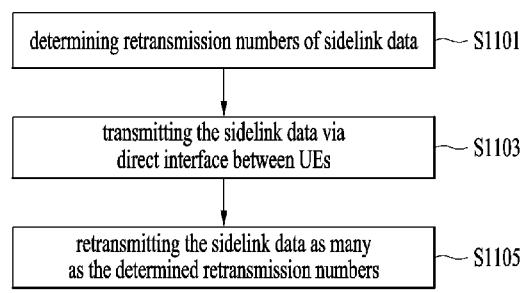
FIG. 11 is a conceptual diagram for determining a number of retransmissions of sidelink data in wireless communication system according to embodiments of the present invention.

FIG. 11 is a conceptual diagram for determining a number of retransmissions of sidelink data in wireless communication system according to embodiments of the present invention.

When the UE transmits sidelink data to a peer UE, the UE determines a number of retransmissions of the sidelink data depending on sidelink status or the feedback information (S1101).

Preferably, a sidelink procedure, which is explained in this description, is operated in serving carrier of the remote UE or in dedicated carrier for sidelink operation. The technology for sidelink operation involves LTE sidelink and UE to network relaying over non-3GPP access (e.g. using WiFi/Bluetooth).

Preferably, the sidelink refers to the link between relay UE and remote UE. The relay is UE to UE relay as well as UE to network relay, and the remote UE is currently connected to the network via relay UE.

Firstly, we explain autonomous retransmission based on sidelink status/QoS without any feedback. In this case, the number of retransmissions of the sidelink data is determined based on up-to-date measured sidelink status between the UEs.

For this, the UE receives retransmission parameters with associated sidelink status ranges from the network via RRC signaling.

Preferably, the retransmission parameter indicates the number of retransmission. The parameter is configured per UE, radio bearer or priority.

Preferably, the associated sidelink status range includes sidelink channel quality (e.g. SD-RSRP, RSSI or RSRP/Q) range or channel busy ratio (CBR) range. The associated sidelink status range may be configured per UE, radio bearer or priority.

Preferably, one or more sidelink status ranges are configured.

After receiving the above retransmission parameters with the associated sidelink status range, the relay/remote UE measures sidelink status (e.g. sidelink channel quality, channel busy ratio) between remote/relay UE.

The example measurement result is SD-RSRP, RSSI and/or RSRP/Q. Other measurement result can be also used. In case of relaying over non-3GPP RAT, the measurement could be performed for the beacon or data part.

Preferably, the UE measures sidelink status at time when the data available for transmission or the UE determines the retransmission parameter, or periodically. Alternatively, the sidelink status is provided by the peer UE periodically or is provided when the sidelink status is above the (pre)configured one upper threshold or below the (pre)configured one lower threshold. One or more upper thresholds and lower thresholds are configured.

The UE determines the retransmission parameter based on the measured sidelink status.

In this case, the measured sidelink status which is used for determining the retransmission parameter is up-to-data measured sidelink status. And the up-to-data measured sidelink status between the UEs belongs to one of sidelink status ranges configured in the UE.

If the sidelink status range is configured per UE, the UE selects the retransmission parameters associated with the sidelink status range to which the measured sidelink status belongs and applies the retransmission parameters to transmissions of all radio bearers.

If the sidelink status range is configured per bearer, for each radio bearer transmission, the UE selects the retransmission parameters associated with the sidelink status range to which the measured sidelink status belongs and applies the retransmission parameters to transmissions of each radio bearer.

If the sidelink status range is configured per priority, for transmission of the packet (e.g. MAC PDU) of each priority, the UE selects the retransmission parameters associated with the sidelink status range to which the measured sidelink status belongs and applies the retransmission parameters to transmissions associated with the priority. Preferably, if multiple SDUs having different priorities are included in one MAC PDU, the UE determines priority of the MAC PDU to be lowest value among priorities of multiple MAC SDUs. The UE selects the retransmission parameters associated with the priority of the MAC PDU.

Preferably, if the associated sidelink status range is configured radio bearer or priority, different retransmission parameters for each radio bearer or priority may be selected with the same measured sidelink status.

Preferably, the retransmission parameters are selected for a UE, radio bearer, or priority, the selected retransmission parameter is continued to be used until the on-going retransmission is over nevertheless change of sidelink status.

Secondly, we explain transmission adaption based slow feedback other than HARQ feedback. In this case, the number of retransmissions of sidelink data is determined based on up-to-date feedback information received from a peer UE.

For this, the network provides feedback configuration to the UE via RRC signaling.

Preferably, the feedback configuration indicates whether to provide the feedback. The feedback configuration is configured per UE, radio bearer or priority.

Preferably, if it is configured to give feedback, time interval (scale) for response to receptions of the packet from the sender UE is also configured.

For example, when the UE receives first packet from the transmitter UE, the UE starts the timer set to configured time value. If the timer expires, the receiver UE sends the feedback information to the sender UE. In this case, the time interval information can be pre-configured/fixed, and the value can be configured per UE, radio bearer or priority.

Alternatively, if it is configured to give feedback, threshold value for sidelink channel quality (e.g. RSRP/RSRQ) for response to receptions of the packet from the sender UE is also configured.

For example, if the sidelink channel quality is above one threshold or the sidelink channel quality is below another threshold, the receiver UE sends the feedback information to the sender UE. In this case, the threshold can be pre-configured/fixed. One or more upper thresholds and lower thresholds are configured. Preferably, even during the above timer is running, the sidelink channel quality condition for sending the response is met, the UE sends the response to the peer UE.

When the UE receives the feedback configuration from the network, the UE determines the retransmission numbers of sidelink data based on up-to-date feedback information received from a peer UE.

The receiver UE starts the timer set to the configured value. If the timer expires, the UE sends the feedback information to the sender UE.

Preferably, the feedback information includes one or more among followings: i) an indication indicating whether to keep, increase or decrease the retransmission numbers, or ii) an indication indicating an appropriate retransmission number, or iii) an indication indicating an appropriate MCS value; or iv) an indication indicating whether to keep, increase or decrease the MCS.

Preferably, the feedback information is provided per UE, radio bearer or priority.

If feedback information is per bearer or priority, the relevant bearer identity (or logical channel identity) or priority information is also provided to the sender UE.

Preferably, the feedback information can be only provided when the data transmission is continued at the time the timer expires.

When the UE determines the retransmission numbers of sidelink data based on up-to-date feedback information received from a peer UE, the UE adjusts the transmission parameters for that bearer if the feedback is provided for specific bearer. If the feedback is provided for specific priority, the UE adjusts the transmission parameters for the bearer associated with the provided priority.

Preferably, the sender UE may also be configured with above feedback information so that the sender UE knows whether there is a feedback.

Preferably, if there is no feedback, the sender UE continue to use the existing transmission parameters.

When the UE determines retransmission numbers of sidelink data, the UE transmits the sidelink data via direct interface between UEs (S1103), and retransmits the sidelink data as many as the determined retransmission numbers (S1105).

After finishing retransmission, the UE newly selects the retransmission parameters according to the up-to-date measured sidelink status, or up-to-date feedback information received from a peer UE.

Preferably, the priority indicates ProSe Per-Packet Priority (PPPP).

Preferably, the retransmission indicates HARQ retransmission (without feedback).

Preferably, the UE indicates remote UE and/or relay UE.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

What is claimed is:

1. A method for a user equipment (UE) operating in a wireless communication system, the method comprising:
 determining a number of retransmissions of sidelink data based on a sidelink status with a peer UE;
 transmitting, to the peer UE, the sidelink data via direct interface with the peer UE;
 receiving, from the peer UE, feedback information informing whether to increase or decrease the number of retransmissions;
 adjusting the number of retransmissions based on the feedback information; and
 retransmitting the sidelink data based on the number of retransmissions,
 wherein the feedback information is transmitted from the peer UE based on the sidelink status being above one threshold or the sidelink status being below another threshold.

2. The method according to claim 1, wherein the up to sidelink status belongs to one of sidelink status ranges, wherein each of the sidelink status ranges is related with a respective number of retransmissions.

3. The method according to claim 1, wherein the sidelink status includes at least one of sidelink channel quality or channel busy ratio.

4. The method according to claim 2, wherein each of the sidelink status ranges is configured per UE, radio bearer or priority.

5. The method according to claim 1, wherein the feedback information further informs at least one of:
 an appropriate retransmission number;
 an appropriate modulation and coding scheme (MCS) value; or
 whether to increase or decrease the MCS value; or
 the sidelink status.

6. The method according to claim 1, wherein the feedback information is transmitted per UE, radio bearer or priority.

7. A User Equipment (UE) for operating in a wireless communication system, the UE comprising:
 a Radio Frequency (RF) module; and
 a processor operably coupled with the RF module and configured to:
 determine a number of retransmissions of sidelink data based on a sidelink status with a peer UE;
 transmit, to the peer UE, the sidelink data via direct interface with the peer UE;
 receive, from the peer UE, feedback information informing whether to increase or decrease the number of retransmissions;
 adjust the number of retransmissions based on the feedback information; and
 retransmit the sidelink data based on the number of retransmissions,
 wherein the feedback information is transmitted from the peer UE based on the sidelink status being above one threshold or the sidelink status being below another threshold.

8. The UE according to claim 7, wherein the sidelink status belongs to one of sidelink status ranges, wherein each of the sidelink status ranges is related with a respective number of retransmissions.

9. The UE according to claim 7, wherein the sidelink status includes at least one of sidelink channel quality or channel busy ratio.

10. The UE according to claim 7, wherein the each of the sidelink status ranges is configured per UE, radio bearer or priority.

11. The UE according to claim 7, wherein the feedback information further informs at least one of:
 an appropriate retransmission number;
 an appropriate modulation and coding scheme (MCS) value; or
 whether to increase or decrease the MCS value; or
 the sidelink status.

12. The UE according to claim 7, wherein the feedback information is transmitted per UE, radio bearer or priority.

* * * * *